April 11, 1933.  P. W. MERCHANT  1,903,429
MIXING DEVICE
Filed Aug. 8, 1929
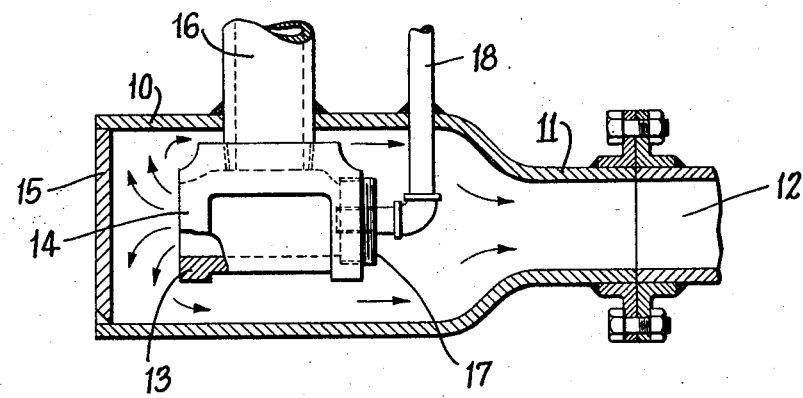
Inventor
Paul W. Merchant
By his Attorney
R. J. Dearborn Patented Apr. 11, 1933

1,903,429

UNITED STATES PATENT OFFICE

PAUL W. MERCHANT, OF PORT ARTHUR, TEXAS

MIXING DEVICE

Application filed August 8, 1929. Serial No. 384,425.

This invention relates to means for effecting an intimate mixture between fluids, such for example as between hydrocarbon oils and treating reagents employed in purifying or treating the oil.

The invention contemplates mixing the fluids in such a way that the direction of flow of the fluids is reversed so as to thus create a condition of turbulence promoting an intimate admixture of the fluids being mixed.

In a preferred embodiment of the invention the mixing device is composed of an outer and inner chamber, the fluids to be mixed being directed into the inner chamber from which they are discharged into the outer chamber against a wall thereof and the outer chamber being provided with an outlet port disposed oppositely to the wall against which the fluids are thus discharged so that in order for the fluids to reach the outlet ports their direction of flow is reversed.

In order to more fully disclose the invention, reference will now be had to the accompanying drawing showing a specific example of the invention, the drawing being a sectional elevation of an apparatus constructed in accordance with the invention and constituting an embodiment thereof.

In the specific example thus illustrated a chamber 10 is shown which may well be constructed in the form of a swaged nipple or pipe having a reduced portion 11 which is open to communicate with an outlet pipe 12. Disposed within the chamber 10 is a chamber 13 which may well be formed of an ordinary T connection, one end of which as at 14 is open to form a discharge port for directing fluid from the chamber 13 into the chamber 10 and against a wall 15 of the latter chamber. The arrangement is such that the wall 15 is disposed in an opposite direction to that of the port to the outlet pipe 12 so that the fluid directed against the wall 15 may thus be suddenly reversed in its direction of flow through the mixing chamber 10.

A pipe 16 is shown connected to one of the ports of the T 13 which extends through the walls of the swaged pipe 10. The other port is shown provided with a pipe 18 of reduced diameter.

In practicing the invention the mixing device illustrated may be employed in mixing oil with acids such as sulphuric acid and other treating or purifying agents that it may be desired to use in treating the oil. Thus the oil may be introduced through pipe 16 and the acid through the pipe 18 being preferably introduced under such pressure that the fluids are dashed against the wall 15 with the result that the direction of flow of the fluids is suddenly reversed creating a condition of turbulence and providing an intimate admixture of the oil and acid or other reagents.

The mixed fluids may then be delivered through the pipe 12 to a coil in order to provide for further contact between the oil and acid and may then be passed to a settling chamber or the fluids may be passed directly from the pipe 12 to a suitable settling chamber.

The mixing device described herein is well adapted for use in connection with hydrogenating hydrocarbon oils and in this use of the invention the oil may be introduced to the pipe 12 and the hydrogen or hydrocarbon containing gas introduced through the pipe 18.

The invention is adapted for admixing gases with gases, or gases with liquids or liquids with liquids and under varying conditions as may be required. Thus for example the pressure on the pipes 16 and 18 may be varied. By having the pressure on the pipe 18 higher than that obtaining on the line 16 the higher pressure stream may operate to produce an injector action to draw in the liquid from the lower pressure line 16.

Obviously many modifications and variations of the invention, as hereinbefore set forth, may be made without departing from the spirit and scope thereof, and therefore, only such limitations should be imposed as are indicated in the appended claims.

I claim:

1. A mixing device comprising an outer chamber having an outlet port, an inner chamber positioned within the outer chamber and having an outlet port disposed oppositely to the outlet port of the outer chamber, pipes extending thru the outer chamber to the inner chamber to form means for admitting fluids to the inner chamber, whereby fluids admitted to the inner chamber are commingled therein, discharged into the outer chamber in one direction and passed to the outlet port of the outer chamber in the opposite direction.

2. A mixing device comprising an outer cylindrical chamber, an inner cylindrical chamber disposed longitudinally within the outer cylindrical chamber, an outlet port for each chamber, said ports being disposed at opposite ends of said chambers so that fluids discharged from the inner chamber to the outer are caused to reverse the direction of flow to reach the outlet port of the outer chamber, means for admitting a stream of fluid to that end of the inner chamber opposite its port and means for admitting another fluid to the inner chamber adapted to discharge a stream of fluid substantially at right angles to the stream of fluid entering the end of the chamber.

In witness whereof I have hereunto set my hand this 27th day of July 1929.

PAUL W. MERCHANT.